(No Model.)
C. M. VAN CLEVE & R. D. RHODES.
PROCESS OF TREATING SLAG AND FURNACE THEREFOR.
No. 545,001. Patented Aug. 20, 1895.
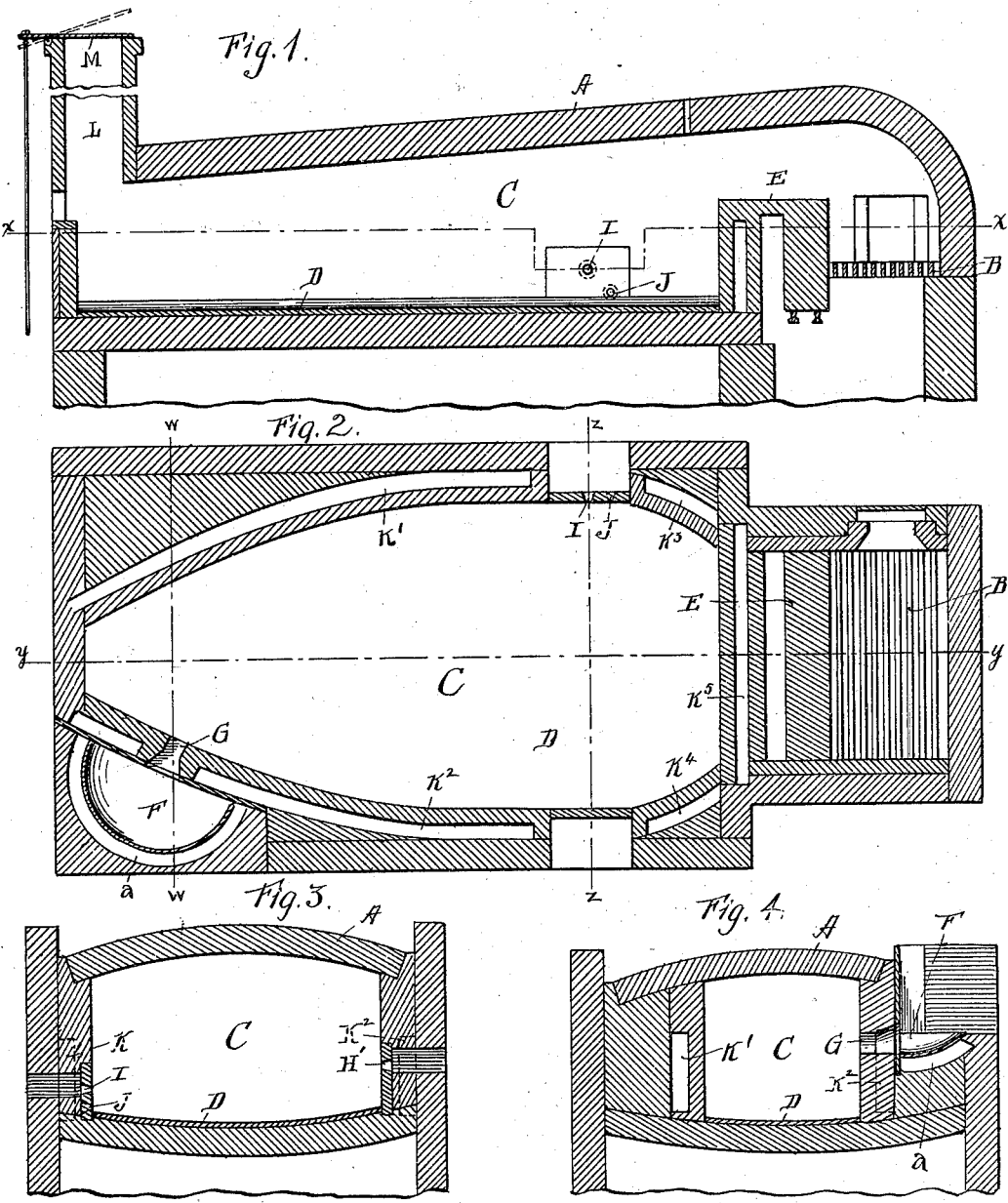
WITNESSES
Geo. M. Anderson
Philip O. Masi.
INVENTORS
C. M. Van Cleve.
Robt. D. Rhodes.
by E. W. Anderson
their Attorney

UNITED STATES PATENT OFFICE.

CHARLES M. VAN CLEVE, OF EL PASO, TEXAS, AND ROBERT D. RHODES, OF LEADVILLE, COLORADO.

PROCESS OF TREATING SLAG AND FURNACE THEREFOR.

SPECIFICATION forming part of Letters Patent No. 545,001, dated August 20, 1895.

Application filed May 21, 1894. Serial No. 511,978. (No model.)

*To all whom it may concern:*

Be it known that we, CHARLES M. VAN CLEVE, a citizen of the United States, residing at El Paso, county of El Paso, State of Texas, and ROBERT D. RHODES, a subject of the Queen of Great Britain, residing at Leadville, in the county of Lake and State of Colorado, have invented certain new and useful Improvements in Processes of Treating Slag and Furnaces Therefor; and we do declare the following to be a full, clear, and exact description of the invention, such as will enable others skilled in the art to which it appertains to make and use the same, reference being had to the accompanying drawings, and to letters of reference marked thereon, which form a part of this specification.

In smelting ores in blast-furnaces where either lead or copper is used for the purpose of collecting the precious metals, the melted material in the crucible or hearth of the furnace separates more or less completely into layers of different composition and value, such separation depending upon the time allowed for settlement, the relative specific gravities of the products formed, the temperature, &c. Where lead is used, the base bullion, being of the greatest specific gravity, settles to the bottom, the matte settles next above the base bullion, while the lighter slag occupies a position above the matte. It has hitherto been proposed to separate the matte from the slag by removing the matte-containing slag from the place of formation while in a liquid condition to an independently-heated reverberatory furnace.

Our invention comprises a novel process and apparatus for the purpose of producing a more complete separation and recovery of the metals in the melted mass produced in blast-furnace smelting, and at the same time increasing the capacity of the blast-furnaces by tapping the imperfectly-separated mixture of slag and matte, still retaining more or less bullion, and drawing it off from the furnace from above the settled bullion, and after transporting it to a separate reverberatory furnace, submitting this mixture, while still in a molten state, to conditions which will facilitate the more complete separation of the products containing the valuable metals from the larger mass, which is finally allowed to go to waste. The conditions favoring this better separation in an independently-heated reverberatory furnace are that the larger area or capacity which it affords gives a better opportunity for separation by gravitation, and the matte is permitted to exercise a better cleansing effect on the slag—that is, it better performs its function of extracting the precious metals from the slag by prolonging the period of its contact with the same, and allowing the separation to take place more gradually than would be the case in the blast-furnace, the refuse material in the shape of clean slag being intermittently tapped from below the top of the filled furnace and run off, while the richer matte and base-bullion are intermittently tapped and run off into separate receptacles through taps arranged at the respective levels of these richer products.

It further consists in employing a reducing atmosphere in said separate reverberatory furnace and providing a covering of charcoal, coal, or other fuel for the top of the charge, which prevents the formation of crust and helps to secure a reduction of the metallic oxides, such as the oxides of silver and lead, and possibly of copper, which are contained in the slag, and which, when reduced, sink to the bottom of the furnace, thereby giving to our process the distinct feature of the separation of valuable metals from the slag; and further, our invention consists in the arrangement of metallic iron in the bottom of the furnace so as to project into the matte but not into the slag, said iron serving to precipitate the lead contained in the matte, which lead, in passing through the matte, will extract from it a considerable portion of the gold and silver therein contained, and collect it in the bottom in the form of base bullion.

For carrying out our invention we have devised a special form of reverberatory furnace, which is shown in the accompanying drawings, in which—

Figure 1 is a vertical longitudinal section. Fig. 2 is a horizontal section through line *x x*, Fig. 1. Fig. 3 is a vertical transverse section through line *z z* of Fig. 2. Fig. 4 is a vertical transverse section through line *w w*, Fig. 2.

In the drawings, A represents a furnace of the general reverberatory form, having a fire-place B, fire-bridge E, and hearth C. This hearth should be of sufficient dimensions to contain a charge of from twenty-five to one hundred tons of the product to be treated. Said hearth is provided with a wrought-iron surface-plate D to prevent any waste of bullion, and the side walls are provided with water-jackets $K'$ $K^2$ $K^3$ $K^4$ $K^5$ to protect them from the action of the slag, which would otherwise soon eat them out.

At any suitable part of the furnace, and at one side of the hearth, there is an external charging-inlet consisting of the semi-dish-form iron receptacle F, which is fitted to the side of the furnace and provided with a spout G, whereby it discharges the molten material into the hearth. This casting F is also surrounded by a water-jacket $a$. Near the fire-bridge the lateral wall of the furnace upon one side is tapped at $H'$ to form a discharge for the clean and refined slag, a second tap I being made on the opposite side at a lower level for the matte, and a third tap J being made at a still lower level for the discharge of the bullion.

The stack L is somewhat larger than the ordinary stack of a reverberatory furnace and has a damper M on top to regulate the draft and provide for the maintenance, or partial maintenance, of the reducing atmosphere in the furnace.

The furnace as thus described should be situated in the neighborhood of the smelting-furnaces and at such a level that the molten materials coming from said furnaces in common slag-pots can be easily carried to the separating-furnace and emptied by simply dumping the pots into the inlet F. The resulting products of the furnace can be carried away either by large pots on trucks, which may be run on sunken tracks, or the matte, or slag, or both, may be granulated.

The process is carried out as follows: A coal fire is built in the fire-place E, and as soon as the furnace becomes sufficiently heated the melted products from the smelting-furnaces are dumped from the pots into the inlet F, whence they run through the spout G into the hearth. It is important that the amount poured into the furnace at any one time be small as compared with the total mass of material held in the furnace, so as not to interfere with the satisfactory settling of different products. The liquid material poured into the furnace being already at a high temperature it is only necessary to employ sufficient heat to avoid the formation of crust, which would otherwise have to be removed. This formation of crust is further avoided by throwing on top of the charge, through an opening T, a layer of charcoal or other fuel. This layer of charcoal not only assists in keeping the slag at the surface of the charge in a condition of satisfactory fluidity, but it also acts as a reducing agent to bring about the reduction into metal of the oxides contained in the slag, these oxides being principally silver and lead, and possibly copper. These reduced metals sink to the bottom of the furnace, where they may be recovered. This feature is an important one, since the metals named are in chemical combination in the slag and cannot be regained by mechanical means. To precipitate to a large extent the lead contained in the matte, which lead, in the form of base bullion, will also carry with it a considerable portion of gold and silver, metallic iron, wrought or cast, is placed in the bottom of the furnace, so as to project into the layer of matte only. The lead thereby reduced to base bullion, together with the base bullion that may have been contained in the melted mixture taken from the blast-furnaces, is drawn off at the bullion-tap J. The purpose of the iron is not to purify the slag by effecting a decomposition of the matte held in suspension in the slag, but to extract from the large body of the matte which settles at the bottom the precious metals and lead contained therein. We do not propose any reaction upon the slag in the use of the iron, as practically the entire bulk of the matte finds its way immediately to the bottom when the mixture is introduced into the furnace, being cleansed by the provision of favorable conditions for mechanical settlement and by the use of the charcoal as a reducing agent. It is usual to draw off the matte and to roast and resmelt it for the purpose of recovering the valuable metals contained therein. This operation always results in a greater or less percentage loss of these valuable metals. It is therefore our object, in using the iron in the matte layers, to precipitate, out of this matte, lead, and with it silver and gold, so as to eliminate promptly as much metal as possible in advance of the retreatment of the matte. It is impossible to bring about this elimination of lead, silver, and gold from fluid matte in a blast furnace, and it is also impossible to effect such elimination to a satisfactory degree in a settling-pot, although to some extent it may be possible; but in the reverberatory furnace the conditions are more favorable, owing to the large mass present and the heat maintained. Another great advantage which we gain by the use of iron in the matte layers is as follows: In the lead-silver smelting operations, especially with the complex ores now generally mined, there results considerable matte. This matte always carries with it a great deal of lead, which, being very volatile, compels treatment of the matte according to the ordinary processes of roasting and smelting. If, however, this lead can be entirely or to a large extent eliminated from the matte, it becomes possible to treat the matte in an entirely different and more economical way by the process known as "raw smelting or concentration." In such process roasting of the matte is not necessary and is not desired. With a small amount of fuel and considerable blast it is possible to utilize the sulphur in the matte to produce the heat necessary for the smelting. Our process results in this elimination of the lead, thereby quickly reducing a valuable metal which is not desired in the matte, and on the other hand, by freeing the matte of lead, makes possible the more economical treatment of the matte for its final disposition. The matte is taken off at I, higher up. The clean slag is taken off at the still higher outlet.

In smelting for matte, known as "sulphide-smelting," with more or less copper in the charge, the ordinary use of a fore hearth for separating the matte is dispensed with and the work is much more conveniently and economically effected by the process herein described.

We are aware, as heretofore acknowledged, that it is not broadly new to run the slag and matte from the blast-furnace to a separate reverberatory furnace, and we do not claim this step broadly.

Our invention is distinctive in the following respect: first, in the use in the reverberatory furnace of the covering of coal, charcoal, or other fuel for the charge and the maintenance of the reducing atmosphere which prevents the formation of crust and by reducing the metals cause them to sink through the mass and to carry with them the precious metals and cleanse the slag; and, secondly, in the use of iron in the layer of matte, avoiding its extension into the slag, whereby it is designed to secure a nearly complete precipitation of the lead from the matte for the purpose of making the matte substantially free from lead, so as to make subsequent operations more economical.

Having thus described our invention, what we claim as new, and desire to secure by Letters Patent, is—

1. The process of separating the slag and matte coming from blast furnaces employed in the reduction of precious metals, and for recovering therefrom the valuable metals, which consists in transferring these mixed products to an independently heated furnace and maintaining them there in a molten condition for separation by gravitation, covering the charge in such furnace with a layer of charcoal or similar material to assist in maintaining the charge in a condition of fluidity and to secure the reducing effect thereof upon the metallic oxides contained in the slag, and introducing into the layers of matte, metallic iron for the purpose of precipitating the lead in the matte in the form of base bullion, substantially as specified.

2. In the separation of the slag and matte coming from blast furnaces, the process of transferring the mixed liquid products to a separate reverberatory furnace, and maintaining them in a molten condition for separation by gravitation, and introducing into the layer of matte but not into the slag metallic iron whereby the lead is precipitated, substantially as and for the purposes described.

3. The process of separating the slag and matte coming from blast furnaces, and recovering the valuable metals which consists in transferring these mixed liquid products to a separate reverberatory furnace, and maintaining them there in a molten condition, charging upon the surface thereof a layer of coal, charcoal, or other fuel, and maintaining above the same a reducing atmosphere, precipitating the lead from the matte as base bullion by means of iron and drawing off base bullion, matte and clean slag at different levels, substantially as and for the purpose described.

4. A reverberatory furnace for treating the slag and matte from blasting furnaces having a hearth provided with a wrought iron surface plate, outlet taps at different levels, a choke damper on its stack, a receptacle inlet on one side, and water jackets in its wall, substantially as specified.

5. The process of separating the slag and matte from one or more blast furnaces and recovering the valuable metals, which consists in intermittently feeding these mixed liquid products into a separate reverberatory furnace, and maintaining them therein in a molten condition for separation by gravitation, and in subjecting the same to the reducing influence, first of a covering of charcoal, coal, or other fuel, secondly to a reducing atmosphere, and finally precipitating the lead from the matte as base bullion by means of iron extending into the matte but not above the same, substantially as specified.

In testimony whereof we affix our signatures in presence of two witnesses.

CHARLES M. VAN CLEVE.
   ROBERT D. RHODES.

Witnesses to signature of Charles M. Van Cleve:
 ROBT. TROJE,
 CARL KOELLE.

Witnesses to signature of Robert D. Rhodes:
 J. H. WEDDLE,
 LUDWIG KLOZ.